United States Patent [19]

McLaughlin

[11] Patent Number: 5,743,351

[45] Date of Patent: Apr. 28, 1998

[54] METHOD AND APPARATUS FOR CONTROLLING AN ELECTRIC ASSIST STEERING SYSEM BY LINEARIZING SYSTEM INPUT-OUTPUT TORQUE GAIN

[75] Inventor: Kevin Michael McLaughlin, Troy, Mich.

[73] Assignee: TRW Inc., Lyndhurst, Ohio

[21] Appl. No.: 654,594

[22] Filed: May 29, 1996

[51] Int. Cl.$^6$ ................................................. B62D 5/04
[52] U.S. Cl. ........................ 180/446; 364/424.051
[58] Field of Search ........................... 180/443, 446; 364/424.051, 424.052

[56] References Cited

U.S. PATENT DOCUMENTS

| | | |
|---|---|---|
| 3,794,900 | 2/1974 | Kobayashi et al. .................. 318/603 |
| 4,681,181 | 7/1987 | Shimizu . |
| 4,688,655 | 8/1987 | Shimizu . |
| 4,745,984 | 5/1988 | Shimizu . |
| 4,837,692 | 6/1989 | Shimizu . |
| 4,896,735 | 1/1990 | Morishita et al. . |
| 4,959,787 | 9/1990 | Morishita et al. . |
| 4,986,381 | 1/1991 | Morishita et al. . |
| 5,053,966 | 10/1991 | Takahashi et al. . |
| 5,198,981 | 3/1993 | Collier-Hauman et al. ..... 364/424.052 |
| 5,204,604 | 4/1993 | Radun ............................... 318/701 |
| 5,257,828 | 11/1993 | Miller et al. . |
| 5,473,231 | 12/1995 | McLaughlin .......................... 318/433 |
| 5,475,289 | 12/1995 | McLaughlin et al. ................. 318/432 |
| 5,504,403 | 4/1996 | McLaughlin .......................... 318/432 |

*Primary Examiner*—Dennis H. Pedder
*Attorney, Agent, or Firm*—Tarolli, Sundheim, Covell, Tummino & Szabo

[57] ABSTRACT

A control arrangement for an electric assist steering system having a variable reluctance motor (26) includes a motor position sensor (54) and an applied steering torque sensor (110). A controller determines a desired motor torque assist value in response to the applied steering torque. The controller modifies the desired torque assist value to linearize the gain relationship between the desired torque assist value and motor torque output. A plurality of look-up tables have a plurality of motor current values versus motor position values stored therein. The controller selects a first (T1) look-up table corresponding to a torque value less than the modified motor torque assist value and a second (T2) look-up table corresponding to a torque value greater than the modified motor torque assist value. A first motor current value (I1) and second motor current value (I2) are determined by interpolation. A final motor current value (ICMD) is determined by interpolating between the first and second determined motor current values. A motor control signal is provided in response to the determined final motor current value.

5 Claims, 3 Drawing Sheets

METHOD AND APPARATUS FOR CONTROLLING AN ELECTRIC ASSIST STEERING SYSEM BY LINEARIZING SYSTEM INPUT-OUTPUT TORQUE GAIN

TECHNICAL FIELD

The present invention is directed to an electric assist steering system and is particularly directed to a method and apparatus for controlling an electric assist steering system by linearizing system input-output torque gain.

BACKGROUND OF THE INVENTION

Electric assist steering systems are well known in the art. Electric assist steering systems that utilize a rack and pinion gear set provide assist by using an electric motor to either (i) apply rotary force to a steering input shaft connected to a pinion gear, or (ii) apply linear force to a steering member having rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and a vehicle speed sensor. A computer receives the output signals provided by both sensors. The computer controls the amount of the assist provided by the motor dependent upon the applied steering torque and the sensed vehicle speed.

It is desirable to use a variable reluctance motor to provide electric assist for steering. One arrangement is disclosed in U.S. Pat. No. 5,257,828 to Miller et al. that uses a variable reluctance motor in an electric assist steering system. In accordance with the '828 patent, current to the motor, referred to as a current command signal, is functionally related to applied steering torque, vehicle speed, and motor rotor position. The steering assist is damped in response to sensed speed of the electric assist motor.

One concern with using a variable reluctance motor to provide steering assist is the amount of acoustic noise produced by the motor during energization as a result of motor torque ripple. To reduce this concern, current profile mapping tables can be stored in memory. These current maps would include motor current values versus rotor position values. The current maps would be selected to provide smooth motor operation, i.e., reduce motor acoustic noise by reducing torque ripple during motor operation.

The amount of acoustic noise and torque ripple occurring during energization of the electric assist motor is functionally related to the number of data values stored in the mapping table. The larger the "space" between motor position versus current values in the table, the more noise that occurs upon motor energization. To store enough values in a current map to ensure a quiet motor operation, requires a substantial amount of memory. Consideration of system size and expense dictates that a current mapping table be limited to a finite size that would not be large enough to provide quiet motor operation. Because of a limited amount of available memory in a controller of an electric assist steering system, a current value would be selected from a look-up table corresponding to the closest motor position value in the table. This type of control would result in an increase in audible motor noise. Interpolation between stored values is one method of determining current commands which reduces noise and ripple without increasing the number of stored values in the current maps.

Typically, variable reluctance motors exhibit a non-linearity of applied current versus torque-out for low current values below that necessary to achieve magnetic saturation of the motor. This would result in a non-linear torque-in versus torque-out characteristic in a steering system even if an interpolation method for achieving current values is used. It is desirable to maintain a linear relationship between torque-in versus torque-out steering characteristics to improve steering feel.

SUMMARY OF THE INVENTION

The present invention is directed to a method and apparatus for controlling an electric assist steering system by linearizing system input-output torque gain in a system which a motor current command is determined by interpolating a current value based upon both applied steering torque and motor position.

In accordance with a preferred embodiment of the present invention, an apparatus is provided for controlling a steering assist system in response to a steering control signal. The steering assist system includes a variable reluctance motor. The apparatus includes motor position sensing means for sensing the relative position between the motor's rotor and stator. Torque sensing means senses applied steering torque. A desired motor torque assist value is determined in response to the applied steering torque. Modifying means provides a modified torque assist value to linearize the gain between the desired torque assist value and motor torque output. A plurality of motor torque look-up tables are provided. Each of the motor torque look-up tables has motor current values that vary as a function of motor position. Control means is provided that selects first and second torque look-up tables from the plurality of look-up tables wherein the first look-up table corresponds to a torque value less than the modified motor torque assist value and the second look-up table corresponds to a torque value greater than the modified motor torque assist value. The control means determines a first motor current value by interpolating between two current values associated with two motor positions stored in the first look-up table closest to the sensed motor position. The control means determines a second motor current value by interpolating between two current values associated with two motor positions stored in the second look-up table closest to the sensed motor position. The control means determines a final motor current value by interpolating between the first and second determined motor current values. A motor control signal is provided in response to the determined final motor current value.

In accordance with a preferred embodiment of the present invention, a method for controlling a steering assist system that provides steering assist using a variable reluctance motor in response to a steering control signal is provided. The method comprises the steps of sensing motor position by sensing the relative position between the motor's rotor and stator, sensing applied steering torque, and determining a desired motor torque assist value in response to the sensed applied steering torque. The method further comprises the steps of modifying the desired torque assist value to linearize the gain between the desired torque assist value and motor torque output and providing a plurality of motor torque look-up tables, each of the motor torque look-up tables has motor current values that vary as a function of motor position. The method then selects first and second torque look-up tables from the plurality of look-up tables wherein the first look-up table corresponds to a torque value less than the modified motor torque assist value and the second look-up table corresponds to a torque value greater than the modified motor assist torque value. The method further comprises the steps of determining a first motor current value by interpolating between two current values corresponding with two motor positions stored in the first look-up table closest to the sensed motor position, and determining a second motor current value by interpolating between two current values corresponding with two motor positions stored in the second look-up table closest to the sensed motor position, and determining a final motor current value by interpolating between the first and second determined motor current values. A motor control signal is provided in response to the determined final motor current value.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENTS

Figure 1:
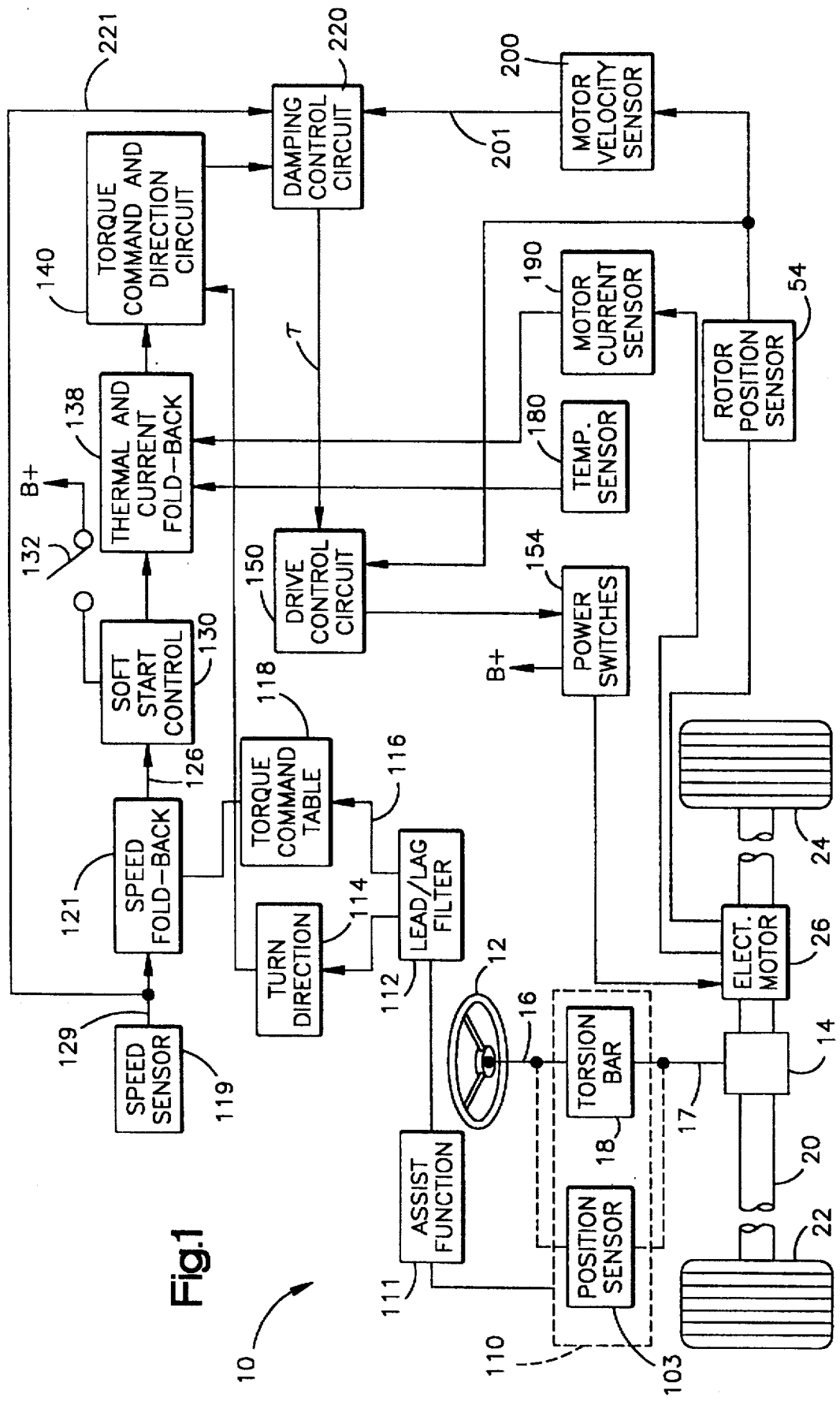
FIG. 1 is a schematic block diagram illustrating an electric assist steering system in accordance with the present invention.

Referring to FIG. 1, an electric assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axis and the vehicle is steered.

An electric assist motor 26 is drivingly connected to the rack 20. When the electric assist motor 26 is energized, it provides steering assist so as to aid in the rotation of the vehicle steering wheel 12 by the vehicle operator. In accordance with a preferred embodiment of the present invention, the electric assist motor 26 is a variable reluctance motor. A variable reluctance motor is desirable for use in an electric assist steering system because of its small size, low friction, and its high torque-to-inertia ratio.

The motor 26 preferably is a four pole motor in which the stator has four pole pairs and the rotor has six rotor poles. The operation of a variable reluctance motor and its principle of operation are well known in the art. Basically, the stator poles are energized in pairs. The rotor moves so as to minimize the reluctance between the energized stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized. The direction of motor rotation is controlled by the sequence in which the stator coils are energized. The torque produced by the motor is controlled by the current through the stator coils. Current through the stator coils is controlled by pulse-width-modulation ("PWM") techniques well known in the art. Current is supplied to the motor by pulse-width-modulating power switches connected between a source of electrical energy and the motor. A preferred manner for controlling a variable reluctance motor in an electric assist steering system is fully disclosed in U.S. Pat. No. 5,257,828, to Miller et al., and assigned to TRW Inc., and which is hereby fully incorporated herein by reference.

The electric assist motor 26 is drivably connected to the rack member 20 preferably with a ball-nut drive arrangement. Such an arrangement is fully described in U.S. Pat. No. 4,415,054 to Drutchas, now U.S. Reissue Pat. No. 32,222, which is hereby fully incorporated herein by reference. Basically, when the motor is energized, the rotor turns which, in turn, rotates the nut portion of the ball-nut drive arrangement. When the nut rotates, the balls transfer a linear force to the rack. The direction of rack movement is dependent upon the direction of rotation of the motor.

A rotor position sensor 54 is operatively connected to the motor rotor and to the motor stator or motor housing. The function of the rotor position sensor is to provide an electrical signal indicative of the position of the motor's rotor relative to the motor's stator. For proper operation of the variable reluctance motor, including direction of rotation and applied torque, it is necessary to know the position of the rotor relative to the stator. A detailed structure of a rotor position sensor is described in the above-incorporated '828 patent to Miller et al.. It is contemplated that other types of rotor position sensors may be used with the present invention.

In a preferred embodiment of the present invention, a physical rotor position sensor is provided. It is also known that rotor position can be determined by means other than a physical position sensor. For example, it is possible to monitor the current through the non-energized stator coils and, based upon the sensed current, the rotor position determined. One specific arrangement for sensing rotor position without a separate position sensor is disclosed in U.S. Pat. No. 5,072,166 which is hereby fully incorporated herein. The present invention contemplates the use of both a separate position sensor and an algorithm that determines the rotor position based on some measured operating parameter, such as current in an non-energized coil.

A steering position sensor 103 is operatively connected across the input shaft 16 and the output shaft 17 and provides an electrical signal having a value indicative of the relative rotational position between the input shaft 16 and the output shaft 17. The position sensor 103, in combination with the torsion bar 18, form a torque sensor 110. The output of the position sensor 103 is indicative of the steering torque applied to the vehicle steering wheel 12 by the vehicle operator.

The output of the torque sensor 110 is connected to a torque assist function circuit 111. The torque assist function circuit 111 outputs a signal having a value functionally related to the applied steering torque wherein the functional relationship is designed to enhance steering feel. One functional relationship contemplated between the output of 111 and the input of applied steering torque is a "smile" curve. Other contemplated relationships include those disclosed in pending U.S. patent application to McLaughlin Ser. No. 246,947, filed May 20, 1994 and U.S. patent application to McLaughlin et al. Ser. No. 212,112, filed Mar. 11, 1994, both of which are hereby fully incorporated herein by reference.

The output of the assist function 111 is connected to a lead/lag filter 112. The lead/lag filter 112 processes the torque signal and separates it into a direction signal 114 and a magnitude signal 116. In processing the torque signal, the lead/lag filter 112 amplifies the value of torque signal.

Those skilled in the art will realize that filtering of the output of the torsion sensor signal may be distributed differently about the torque command table 118 than is specifically shown and described. For example, the output of the assist function circuit 111 may be directly connected to the table 118 and the filtering 112 occurring at the output of the table.

The torque magnitude value 116 is converted to a torque command signal preferably by use of a first torque look-up table 118 based upon the torque magnitude. The torque command is a value indicative of a desired torque assist from the electric assist motor. This value is also referred to as the torque demand. The output of the torque command table 118 is connected to a speed fold-back circuit 121. A vehicle speed sensor 119 is operatively connected to the vehicle and has an output 129. Speed sensor 119 provides a signal 129 having a value indicative of the vehicle's speed. Those skilled in the art appreciate that a vehicle speed sensor includes a device connected to the vehicle wheels or to the vehicle transmission that generates pulses at a frequency that is a function of the vehicle speed. The speed sensor further includes circuitry that converts the pulse frequency into a signal having a value indicative of the vehicle speed.

Output 129 of the speed sensor 119 is operatively connected to the speed fold-back circuit 121 and to a damping control circuit 220. The output 129 of speed sensor 119 and the output from the torque command table 118 are combined in speed fold-back circuit 121. As is well known in the art, the amount of assist desired for a vehicle steering system decreases as vehicle speed increases. Therefore, to maintain a proper or desirable feel for all steering maneuvers, it is desirable to decrease the amount of steering assist as the vehicle speed increases. This is accomplished using the speed fold-back circuit 121 in a manner known in the art. The output 126 of the speed fold-back circuit is a torque command signal that is "corrected" as a function of vehicle speed.

The output 126 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle the instant the vehicle is being started. It is not uncommon for the vehicle operator to be applying torque to the steering wheel with one hand while he is turning the ignition switch to the starting position. If full assist were immediately available, the steering wheel would jerk in his hand. The soft start circuit prevents this unpleasant event from happening and simulates the operation of a hydraulic assist steering system which does not provide full assist until the vehicle motor is running at speed (as opposed to cranking speed).

The output of the soft start circuit, after an initial time delay for starting of the vehicle, is the torque demand or request signal "corrected" for vehicle speed. The output of the soft start circuit is connected to a thermal and current fold-back circuit 138 that further modifies the torque request signal as a function of the current through the motor as sensed by a motor current sensor 190 and the temperature of the switches 154 used to drive the motor or temperature of the main system controller. The temperature fold-back circuit reduces the value of the torque demand output from the soft start control 130 as sensed temperature increase above a predetermined value.

The output of the fold-back circuit 138 is connected to the torque command and direction circuit 140. The direction signal 114 is also connected to the torque command and direction circuit 140. The circuit 140 recombines the torque direction signal with the torque demand signal that has been "corrected" for (i) vehicle speed, (ii) soft start, (iii) sensed motor current, and (iv) sensed temperature of the switches or controller. The output of the torque command and direction circuit 140 is connected to the damping control circuit 220.

The output τ of the damping control circuit 220 is connected to a drive control circuit 150. The output of the motor position sensor 54 is also connected to the drive control circuit 150. Based upon the output of the damping control circuit 220, which is functionally related to the value of the output of the torque command and direction circuit 140 and based upon the position of the rotor, the drive control circuit 150 provides a motor control signal used to control energization of the electric assist motor 26 in terms of sequence and current applied to the stator coils through a plurality of switches 154.

The drive control circuit 150 is preferably a microcomputer. Commutation or drive pulses may need to be output to the stator windings at a rate faster than the motor position data can be processed from the sensor 54 to insure smooth operation of the variable reluctance motor. To solve this problem, it is preferable that the position of the rotor be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6–8, 1985, both papers being hereby fully incorporated herein by reference.

As mentioned, the temperature sensor 180 is operatively connected to either the switches 154 of each coil pair, which are connected to a common heat sink, or to the microcomputer. The output of the temperature sensor 180 is connected to the thermal and current fold-back circuit 138. If the temperature of the switches 154 or controller is too high, i.e., greater than a predetermined value, the torque demand signal is decreased to prevent damage to the switches or controller.

As also mentioned, the motor current sensor 190 is operatively connected to the electric motor 26 for sensing the amount of current therethrough. The output of the current sensor 190 is connected to the thermal and current fold-back circuit 138. If the sensed current through the motor is too high, i.e., greater than a predetermined value, the value of the torque demand signal is decreased to prevent the switches from burning out.

The output from the rotor position sensor 54 is also connected to a motor velocity sensor circuit 200. The change in the rotor position as a function of time (differential) is indicative of the rotor and, in turn, the motor velocity. The output of the motor velocity sensor 200 is an electric signal having a value indicative of the motor speed and sign, i.e. direction, of rotation. Rather than differentiating the rotor position, i.e., change in rotor position as a function of time, those skilled in the art will appreciate that other velocity sensing arrangements could be used to determine rotor speed and direction of rotation such as a tachometer connected to the rotor or a curve fitting arrangement using look-up tables.

Velocity sensor 200 has an output 201 connected to the damping control circuit 220. The output 201 of sensor 200 provides a signal indicative of motor velocity. The motor velocity signal has both a magnitude component and a direction of rotation component.

Damping control circuit 220 outputs a damped torque command and direction signal τ to the drive control circuit 150. The torque command signal is damped an amount functionally related to the value of the sensed motor velocity and the value of the sensed vehicle speed. The damping function on the torque command signal can either be a linear or a non-linear function of sensed vehicle speed and sensed motor velocity. To improve system stability, damping is low at low vehicle speeds and low motor velocity. Damping increases when vehicle speed remains low and motor velocity increases. As both vehicle speed and motor velocity increase, the damping also increases. Damping is fully discussed in the above-incorporated '828 patent to Miller et al.

It should be appreciated that the damping is functionally related to the motor rate feed-back and is also functionally related to the sensed vehicle speed. One would like an electric assist system to simulate at least the feel of a hydraulic system.

Figure 2:
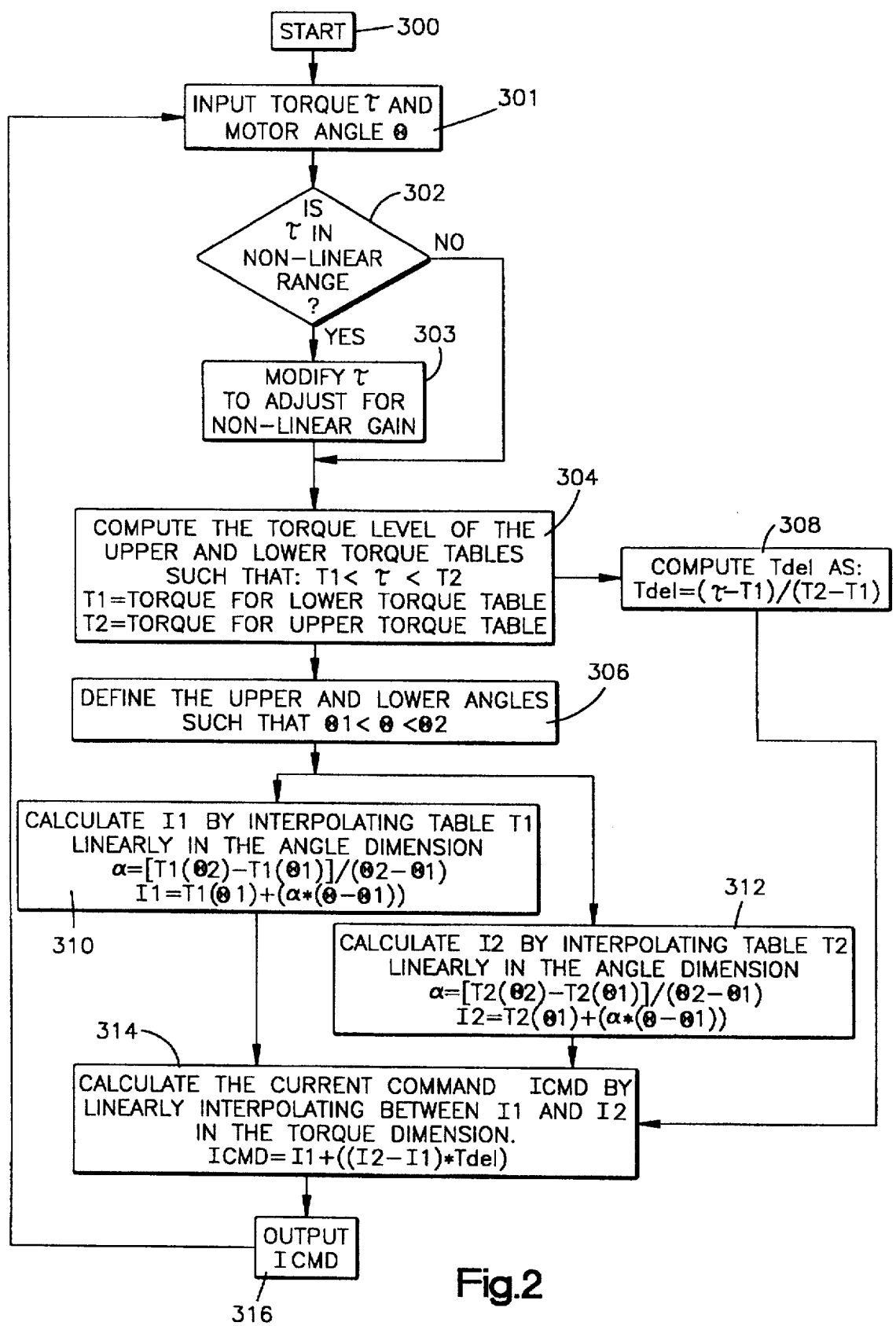
FIG. 2 is a flow diagram illustrating the control process followed by the drive control circuit of FIG. 1.
Figure 3:
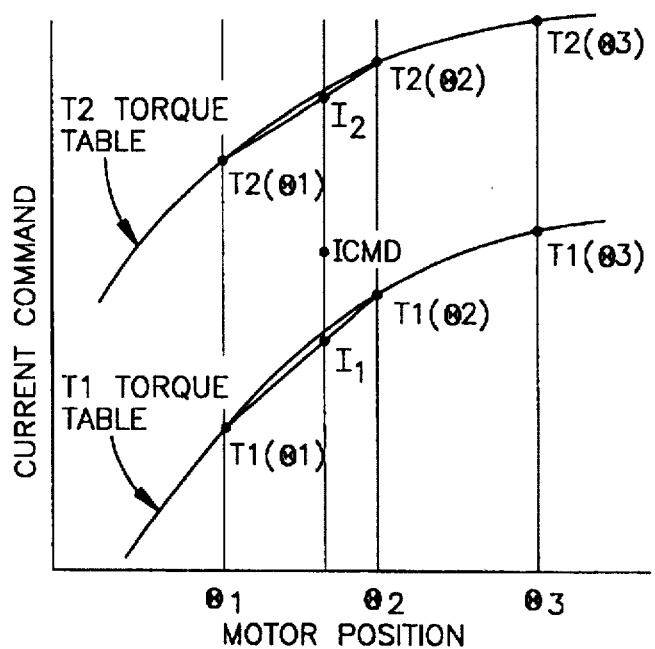
FIG. 3 is a graphical representation of the current command values determined by the drive control circuit of FIG. 1.

Referring to FIGS. 2, and 3, a control process for controlling the assist motor current will be better appreciated. As mentioned, preferably, the drive control circuit 150 is embodied in a microcomputer. The microcomputer has stored therein a plurality of torque tables. These torque tables have motor current values as a function motor position stored therein. In accordance with one preferred embodiment of the present invention, there are ten torque tables designated T1 through T10. Each of the torque tables have associated discrete values of desired motor current associated with discrete motor position values Θ that will achieve the desired torque assist. Desired motor current values are functionally related to motor position values. The output from the damping control circuit 220 is referred to as the desired torque assist. This output represents the torque command that is further corrected to provide yaw rate stability.

The torque table T1 is for minimal applied steering torque conditions and the torque table T10 is for the maximum anticipated applied steering torque. Since these applied torque tables represent 10 different applied steering torque values, the desired torque value τ output from the damping control circuit 220 will typically fall between two of these 10 discrete torque values.

The relationship of applied motor current to torque gain for a variable reluctance motor is non-linear for low current command signals, particularly for current command signals below magnetic saturation of the motor. The current to torque gain is substantially linear for higher current command signal values. The non-linear relationship in current to torque gain for low current command values results in a non-linear system torque-in to torque-out characteristic. If uncorrected, the steering system would exhibit a non-linear torque-in to torque-out characteristic for relatively small torque requests through the steering wheel and a linear torque-in to torque-out characteristic for high steering torque requests. The system input torque is the torque value from damping control circuit 220 and the system output torque is the actual torque produced by the motor.

The torque table current maps described above are determined to provide a current command signal for a desired motor torque output value at a rotor position value Θ. The discrete current values for a discrete motor position value in a specific torque table are empirically determined to compensate for the non-linear relationship of current to torque gain for low current command values. However, when a desired torque assist value is between stored torque tables and between stored motor positions within a table, interpolation is used to determine the current command value for the desired torque assist value. When linear interpolation is used to determine the current command values, a non-linearity of the relationship of current to torque gain in the low current command ranges results in non-linear system torque-in to torque-out characteristics. Therefore, a linear interpolation method results in a non-linear steering characteristic.

It is desirable to have a linear system torque-in to torque-out characteristic throughout all operating current commands. Linearizing the gain for low current commands provides a linear system torque-in to torque-out gain for all current commands, thereby increasing bandwidth, responsiveness and improving steering feel.

Figure 4:
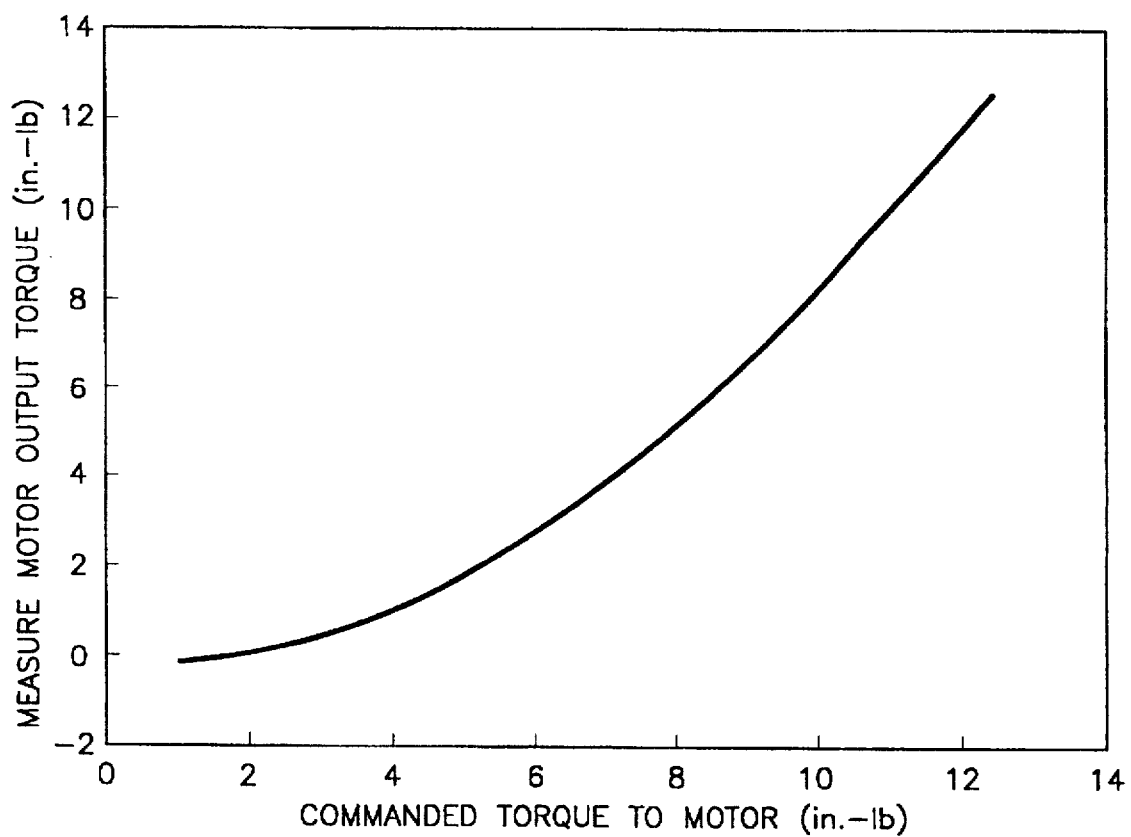
FIG. 4 is a graphical representation of commanded desired motor assist torque and measured motor torque for a system using linear interpolation to determine current commands.

Referring to FIG. 4, the non-linearity of the system torque-in to torque-out gain characteristics may be seen for low command current values for a variable reluctance motor using linear interpolation to determine the current commands. Torque commanded to the motor, i.e. desired assist torque τ, is on the X-axis and measured motor output torque $\tau_{MEAS}$ is shown on the Y-axis. When a low desired torque assist is commanded with a current command below magnetic saturation, the measured output torque is not a linear function of the commanded torque.

In a preferred embodiment of the present invention, when interpolation is used to determine current command values between discrete values in torque tables, the system input-output torque gain characteristics are linearized by modifying the desired torque assist value τ prior to the interpolation process.

Referring to FIG. 2, the control process begins in step 300 where the microcontroller initializes itself in a manner well known in the art. During this initialization stage, volatile internal memories are cleared, registers are set to initial values, flags are set to initial conditions, etc. The process proceeds to step 301 where the system input torque value τ and the motor position Θ are both monitored by the drive control circuit 150. The torque value τ is the damped torque value output from the damping control circuit 220 which, as monitored, is functionally related to the applied steering torque. The motor position value Θ is the value output from the rotor position sensor 54. The process then proceeds to step 302.

In step 302, a determination is made as to whether the desired torque assist value τ is in a non-linear system torque-in to torque-out gain characteristic range. The desired torque value τ is compared to a predetermined threshold value. When the desired torque assist value is less than the predetermined threshold value, the motor is operating in a non-linear range. The threshold value for a motor may be empirically determined by measuring the output torque of the motor for a commanded torque input using linear interpolation between the tables. If the determination in step 302 is affirmative, indicating operation in the non-linear region, the process proceeds to step 303.

In step 303, the desired torque assist τ is modified to provide a linearizing torque command $\tau_{LIN}$ which produces a motor torque output which is linearly related to the desired torque assist τ. From FIG. 4 it will be appreciated that the linearizing torque command $\tau_{LIN}$ may be expressed as a function of the empirically determined measured output torque $\tau_{MEAS}$ $$\tau_{LIN} = (12.045 * \tau_{MEAS} + 5.78)^{1/2} \quad (1)$$

Using equation 1, setting the value of the desired assist torque τ equal to $\tau_{MEAS}$ provides the modified torque command $\tau_{LIN}$ which results in a linear system input-output torque gain characteristics. The $\tau_{LIN}$ is then used to control the motor torque. The linearizing torque $\tau_{LIN}$ from Equation 1 is provided to step 304 where the interpolation process begins. It will be appreciated by one skilled in the art that the input-output torque gain characteristics may be linearized by an equation having a form or order different than that of Equation 1. If the determination in step 302 is negative, indicating that the desired torque assist τ is in a linear region, the desired torque assist τ from step 220 is provided to step 304 where the interpolation process begins.

For purposes of illustration of the interpolation process in steps 304 and on, the desired motor torque is simply referred to as τ and is either the value τ from the damping control circuit 220 or the modified $\tau_{LIN}$ value. In effect, τ is set equal to $\tau_{LIN}$ if necessary. It is assumed that the torque value τ, falls between torque values T1 and T2 where T1<τ<T2. Each of the 10 torque look-up tables have stored current values that vary as a function of sensed motor position Θ. The motor position values Θ in the table are also discrete values. Therefore, a typical measured motor position angle Θ will fall between two discrete angle values stored in the table. Although the graphs of the tables T1 and T2 are shown as continuous curves, it will be appreciated that discrete current command values are stored for discrete motor positions.

For the purposes of illustration below, it is assumed that the motor position angle Θ is between two values Θ1 and Θ2 where Θ1<Θ<Θ2.

The process proceeds to step 304 where it is determined between which two torque values the torque τ falls. As mentioned, for the purpose of illustration, it is assumed that the torque value τ falls between torque values T1 and T2. Therefore, these two torque tables are used in determining the current command to the electric assist motor. The process then proceeds to step 306 where the upper and lower values of motor position are determined, i.e., between which two stored angle positions does the measured motor position fall.

Simultaneously, a value Tdel is determined in accordance with $$Tdel = \frac{(\tau - T1)}{(T2 - T1)} \quad (2)$$

in step 308.

From step 306, the process proceeds to step 310 where a first current value I1 is calculated based upon an interpolated value from the first torque table T1. To determine I1, current values are determined for the lower motor position Θ1 and for upper motor position value Θ2. The value for I1 is the interpolated current value between the lower determined value and the upper determined value. The lower determined value from the T1 look-up table is designated T1(Θ1) and the upper determined value from the T1 look-up table is designated T1(Θ2). The interpolation is done linearly in the angle dimension. The interpolated angle can be expressed as follows:

$$\alpha = \frac{T1(\Theta 2) - T1(\Theta 1)}{(\Theta 2 - \Theta 1)} \quad (3)$$

so that the current value I1 may be expressed as:

$$I1 = T1(\Theta 1) + (\alpha \times (\Theta - \Theta 1)) \quad (4)$$

where Θ is the present motor position.

A second current value I2 is similarly determined in step 312. The second current value I2 is calculated based upon an interpolated value from the second torque table T2. To determine I2, current values are determined for the lower motor position Θ1 and for upper motor position value Θ2. The value for I2 is the interpolated current value between the lower determined value and the upper determined value. The lower determined value from the T2 look-up table is designated T2(Θ1) and the upper determined value from the T2 look-up table is designated T2(Θ2). The interpolation is done linearly in the angle dimension. The interpolated angle can be expressed as follows:

$$\alpha = \frac{T2(\Theta 2) - T2(\Theta 1)}{(\Theta 2 - \Theta 1)} \quad (5)$$

so that the current value I2 may be expressed as:

$$I2 = T2(\Theta 1) + (\alpha \times (\Theta - \Theta 1)) \quad (6)$$

After the two current values I1 and I2 are determined from the two torque tables T1 and T2, respectively, the final motor command current ICMD is determined by another interpolation in step 314. Again this is a linear interpolation using the term Tdel determined in step 308. The final motor command current ICMD may be expressed as follows:

$$ICMD = I1 + ((I2 - I1) \times Tdel) \quad (7)$$

After the determination of the final current command value ICMD in step 314, the current command is output in step 316 by the drive control circuit 150. The drive control circuit 150 pulse-width-modulates the power switches 154 so as to achieve this determined current value in the electric assist motor. The process then loops back to step 301.

Those skilled in the art will appreciate that the motor current is controlled in accordance with this invention in an infinitely smooth manner from look-up tables having a finite set of stored data values. This arrangement significantly reduces audible noise from the electric assist motor.

Those skilled in the art will further appreciate that the interpolation shown and described herein is linear interpolation. The present invention also contemplates that non-linear interpolation may be used.

It should further be appreciated that it is desirable to include self-diagnostic features in the drive control circuit to insure proper operation of the assist arrangement. Such a diagnostic arrangement for electric assist steering systems is fully described in U.S. Pat. No. 4,660,671 which is hereby fully incorporated herein by reference.

From the above description of the invention, those skilled in the art will perceive improvements, changes and modifications. Such improvements, changes and modifications within the skill of the art are intended to be covered by the appended claims.

Having described the invention, we claim the following:

1. An apparatus for controlling a steering assist system, said steering assist system providing steering assist in response to a steering control signal, said steering assist system including a variable reluctance motor, said apparatus comprising:

motor position sensing means for sensing the relative position between the motor's rotor and stator;

torque sensing means operatively connected to a vehicle hand wheel for sensing applied steering torque;

motor torque assist determining means for determining a desired motor torque assist value in response to the sensed applied steering torque;

modifying means for modifying said desired torque assist value to linearize the gain between said desired torque assist value and motor torque output;

a plurality of motor torque look-up tables, each of said motor torque look-up tables having a plurality of motor current values that vary as a function of motor position;

control means operatively connected to said modifying means and to said motor position sensing means, said control means (i) selecting a first and second torque look-up table from said plurality of look-up tables wherein said first look-up table corresponds to a torque value less than the modified motor torque assist value and said second look-up table corresponds to a torque value greater than the modified motor torque assist value, (ii) determining a first motor current value by interpolating between two current values associated with the two motor positions stored in the first look-up table closest to the sensed motor position, (iii) determining a second motor current value by interpolating between two current values associated with the two motor positions stored in the second look-up table closest to the sensed motor position, and (iv) determining a final motor current value by interpolating between the first and second determined motor current values; and providing a motor control signal in response to said determined final motor current value.

2. The apparatus of claim 1 wherein said control means includes means for determining said first motor current value, said second motor current value, and said final motor current value using linear interpolation.

3. The apparatus of claim 1 wherein said modifying means modifies said desired torque assist by a non-linear function.

4. A method for controlling a steering assist system, said steering assist system providing steering assist in response to a steering control signal, said steering assist system including a variable reluctance motor, said method comprising the steps of:

sensing motor position by sensing the relative position between the motor's rotor and stator;

sensing applied steering torque;

determining a desired motor torque assist value in response to the sensed applied steering torque;

modifying said desired torque assist value to linearize the gain between said desired torque assist value and motor torque output;

providing a plurality of motor torque look-up tables, each of said motor torque look-up tables having a plurality of motor current values that vary as a function of motor position;

selecting a first and second torque look-up table from said plurality of look-up tables wherein said first look-up table corresponds to a torque value less than the modified motor torque assist value and said second look-up table corresponds to a torque value greater than the modified motor torque assist value;

determining a first motor current value by interpolating between two current values corresponding with two motor positions stored in the first look-up table closest to the sensed motor position;

determining a second motor current value by interpolating between two current values corresponding with two motor positions stored in the second look-up table closest to the sensed motor position;

determining a final motor current value by interpolating between the first and second determined motor current values; and providing a motor control signal in response to said determined final motor current value.

5. The method of claim 4 wherein said steps of determining said first motor current value, said second motor current value, and said final motor current value use linear interpolation.

* * * * *